US012258789B2

(12) United States Patent
Su et al.

(10) Patent No.: US 12,258,789 B2
(45) Date of Patent: Mar. 25, 2025

(54) DRIVING MECHANISM FOR DOOR LOCK, AND DOOR LOCK

(71) Applicant: Shenzhen Kaadas Intelligent Technology Co., Ltd., Guangdong (CN)

(72) Inventors: Qiyun Su, Guangdong (CN); Zhongxiang Liang, Guangdong (CN)

(73) Assignee: SHENZHEN KAADAS INTELLIGENT TECHNOLOGY CO., LTD., Guangdong (CN)

( * ) Notice: Subject to any disclaimer, the term of this patent is extended or adjusted under 35 U.S.C. 154(b) by 119 days.

(21) Appl. No.: 18/128,443

(22) Filed: Mar. 30, 2023

(65) Prior Publication Data

US 2023/0304325 A1 Sep. 28, 2023

Related U.S. Application Data

(63) Continuation of application No. PCT/CN2021/114785, filed on Aug. 26, 2021.

(30) Foreign Application Priority Data

Sep. 30, 2020 (CN) ......................... 202011070318.9
Sep. 30, 2020 (CN) ......................... 202022222564.3
(Continued)

(51) Int. Cl.
*E05B 47/00* (2006.01)
*E05B 47/06* (2006.01)

(52) U.S. Cl.
CPC ...... *E05B 47/0012* (2013.01); *E05B 47/0611* (2013.01); *E05B 2047/0022* (2013.01)

(58) Field of Classification Search
CPC ............... E05B 47/0012; E05B 47/063; E05B 2047/0018; E05B 2047/002; E05B 2047/0022
See application file for complete search history.

(56) References Cited

U.S. PATENT DOCUMENTS 4,691,584 A * 9/1987 Takaishi .................. E05B 79/20 292/201
5,359,884 A * 11/1994 Fey ..................... E05B 47/0012 73/115.01
(Continued)

FOREIGN PATENT DOCUMENTS

CN 206091586 U 4/2017
CN 108260906 A 7/2018
(Continued)

OTHER PUBLICATIONS

International Search Report and Written Opinion dated Nov. 25, 2021 received in International Application No. PCT/CN2021/114785.

*Primary Examiner* — Christopher J Boswell
(74) *Attorney, Agent, or Firm* — Scully, Scott, Murphy & Presser, P.C.

(57) ABSTRACT

A driving mechanism for a door lock and a door lock are provided. The driving mechanism includes a motor, a planetary gear assembly, and a cage. The planetary gear assembly includes a ring gear, a planet gear, and a sun gear. The motor is rotatably connected to the ring gear. The planet gear is further rotatably connected to the sun gear. The planet gear is connected to the cage. When the sun gear is in a fixed state, the ring gear is driven by the motor to rotate. When the ring gear is in a fixed state, the sun gear, the planet gear, and the cage are configured to cooperate with one another, to make the planet gear rotates relative to the sun gear and the cage rotate.

16 Claims, 7 Drawing Sheets

(30) Foreign Application Priority Data

| | | |
|---|---|---|
| Mar. 24, 2021 | (CN) | 202110316631.4 |
| Mar. 24, 2021 | (CN) | 202120603238.9 |

(56) References Cited

U.S. PATENT DOCUMENTS

| | | | | |
|---|---|---|---|---|
| 9,326,094 | B2 * | 4/2016 | Johnson | E05B 47/026 |
| 9,546,504 | B2 * | 1/2017 | Overgaard | E05B 47/02 |
| 11,761,241 | B2 * | 9/2023 | Zhou | E05B 47/0012<br>70/278.7 |
| 11,959,308 | B2 * | 4/2024 | Petty | E05B 47/0012 |
| 2023/0243185 | A1 * | 8/2023 | Su | E05B 47/0012<br>70/277 |
| 2023/0323703 | A1 * | 10/2023 | Su | E05B 47/0012 |
| 2024/0076905 | A1 * | 3/2024 | Overgaard | E05B 47/0012 |
| 2024/0218702 | A1 * | 7/2024 | Niegmann | E05B 47/0012 |

FOREIGN PATENT DOCUMENTS

| | | | |
|---|---|---|---|
| CN | 108533091 | A | 9/2018 |
| CN | 110439376 | A | 11/2019 |
| CN | 110644868 | A | 1/2020 |
| DE | 202016104688 | U1 | 11/2017 |
| EP | 1074681 | A1 | 2/2001 |

* cited by examiner

DRIVING MECHANISM FOR DOOR LOCK, AND DOOR LOCK

CROSS-REFERENCE TO RELATED APPLICATIONS

This application is a continuation of International Application No. PCT/CN2021/114785, filed Aug. 26, 2021, which claims priority to Chinese Patent Application No. 202022222564.3, filed Sep. 30, 2020, Chinese Patent Application No. 202011070318.9, filed Sep. 30, 2020, Chinese Patent Application No. 202120603238.9, filed Mar. 24, 2021, and Chinese Patent Application No. 202110316631.4, filed Mar. 24, 2021, the entire disclosures of which are hereby incorporated by reference.

TECHNICAL FIELD

This disclosure relates to the field of door-lock mechanism technology, and in particular to a driving mechanism for a door lock and a door lock.

BACKGROUND

With increasing number of populations, the number of houses also continues to increase. Door locks are one of important mechanisms that control opening or closing of the houses. Therefore, expectations and requirements of people for the door locks are higher and higher. At present, the door lock usually adopts a motor lock, that is, a motor drives a cylinder plug to rotate to open or close a door. However, once the motor of the electric lock or other mechanisms of the motor lock fail, the whole electric lock is unable to move, and a user is unable to open the door from the inside of the house, thereby greatly increasing a difficulty and a risk of opening the door.

SUMMARY

In a first aspect, a driving mechanism for a door lock is provided in the present disclosure. The driving mechanism includes a motor, a planetary gear assembly, and a cage. The planetary gear assembly includes a ring gear, a planet gear, and a sun gear. The motor is rotatably connected to the ring gear. The planet gear is rotatably connected to the ring gear, and the planet gear is also rotatably connected to the sun gear. The cage is connected to the planet gear. When the sun gear is in a fixed state, the ring gear is driven by the motor to rotate, to make the planet gear rotate relative to the sun gear, to drive the cage to rotate; or when the ring gear is in a fixed state, the sun gear, the planet gear, and the cage are configured to cooperate with one another, to make the planet gear rotate relative to the sun gear and the cage rotate.

In a second aspect, a driving mechanism for a door lock is further provided in the present disclosure. The driving mechanism includes a motor, a cage, and a universal joint. The cage is rotatably connected to the cage. The universal joint is rotatably connected to the cage. The cage has a first rotation direction. The universal joint has a second rotation direction. The first rotation direction intersects the second rotation direction. The universal joint defines an accommodating groove for connecting a cylinder plug.

In a third aspect, a door lock is further provided in the present disclosure. The door lock includes a cylinder plug and a driving mechanism. The driving mechanism includes a motor, a planetary gear assembly, and a cage. The planetary gear assembly includes a ring gear, a planet gear, and a sun gear. The motor is rotatably connected to the ring gear. The planet gear is rotatably connected to the ring gear, and the planet gear is also rotatably connected to the sun gear. The cage is connected to the planet gear. When the sun gear is in a fixed state, the ring gear is driven by the motor to rotate, to make the planet gear rotate relative to the sun gear, to drive the cage to rotate; or when the ring gear is in a fixed state, the sun gear, the planet gear, and the cage are configured to cooperate with one another, to make the planet gear rotate relative to the sun gear and the cage rotate. The cylinder plug is connected to the driving mechanism. The cylinder plug is driven by the driving mechanism to move to open or close a door.

BRIEF DESCRIPTION OF THE DRAWINGS

To describe technical solutions in implementations of the present disclosure more clearly, the following will describe accompanying drawings required for describing implementations of the present disclosure.

Figure 1:
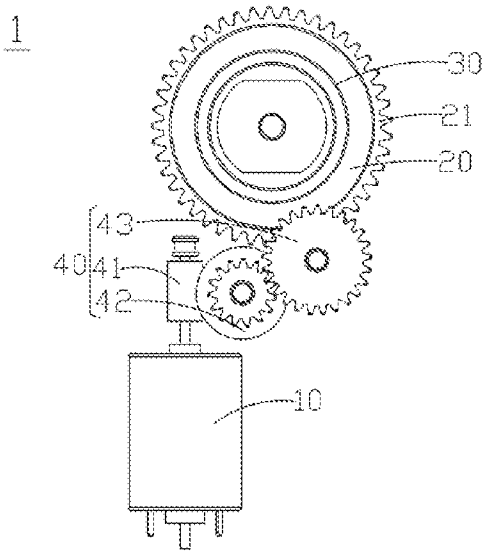
FIG. 1 is a schematic structural view of a driving mechanism in an implementation of the present disclosure.

REFERENCE SIGNS driving mechanism—1, motor—10, planetary gear assembly—20, ring gear—21, accommodating space—211, planet gear—22, sun gear—23, first side—24, second side—25, cage—30, groove—31, boss—32, first connecting portion—33, second connecting portion—34, transmission mechanism—40, worm—41, worm wheel—42, gear assembly—43, first gear—431, second gear—432, third gear—433, first rotating shaft—434, second rotating shaft—435, bracket assembly—50, via hole—500, first bracket—51, buffer groove—511, first protrusion—512, second bracket—52, second protrusion—521, first elastic member—53, handle bracket—54, second elastic member—55, limiting portion—56, first accommodating groove—57, third bracket—58, slot—580, second accommodating groove—581, third elastic member—59, housing—60, receiving space—61, through hole—62, snap-fit portion—63, lug—630, limiting groove—64, universal joint—70, third accommodating groove—71, third protrusion—72, first rotation space—73, first rotation portion—74, second rotation portion—75, second rotation space—76, via hole—77, rotating shaft—78, protective portion—79, connecting member—80, first limiting portion—81, second limiting portion—82.

DETAILED DESCRIPTION

The following are preferred implementations of the present disclosure. It should be noted that those of ordinary skill in the art may further make improvements and modifications without departing from the principle of the present disclosure, and these improvements and modifications are also considered to be within protection of the present disclosure.

Before the technical solutions of the present disclosure are introduced, technical problems in the related art are further introduced in detail below.

A door lock is one of important structural components on a door, and can control opening, closing, locking, etc., of the door. In the related art, a purely mechanical door lock structure is usually adopted, that is, a key is utilized to drive a structure in the door lock to move to open or close the door. With development of science and technology and changing requirements of users, nowadays electronic locks have appeared in visual fields of people and are popular among the users. An electronic lock normally does not require a key, and can automatically drive the structure in the door lock through a built-in circuit to open or close the door only by means of methods such as face recognition, password input, fingerprint input, voice recognition, etc. This brings great convenience and improves user experience. However, once a motor, a circuit structure, or other structural components in a motor lock fail, resulting in a problem occurs in a certain component in the motor lock, the motor lock will be unable to operate normally, and a user outside the door will be unable to open the door to enter the room by a method of unlocking the door with an electronic lock, and can only enter the room only by a method of unlocking the door with a key. In addition, a user at the inner side of the door will be unable to open the door to walk out of the room, such that the door or the door lock can only be violently disassembled, thereby causing irreversible damage to the door and greatly increasing a difficulty and a risk of unlocking.

Figure 2:
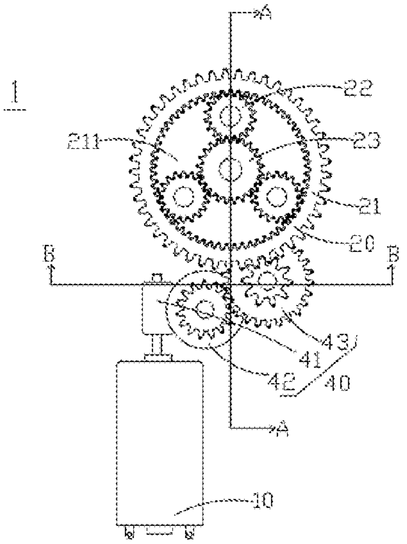
FIG. 2 is a schematic structural view when a cage is removed in FIG. 1.
Figure 3:
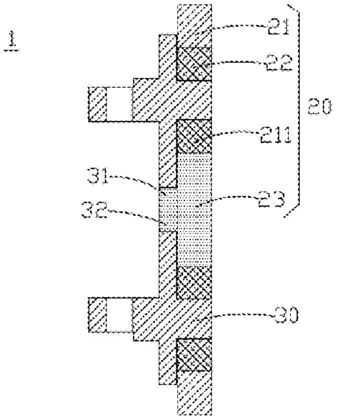
FIG. 3 is a schematic view taken in direction A-A in FIG. 2.
Figure 4:
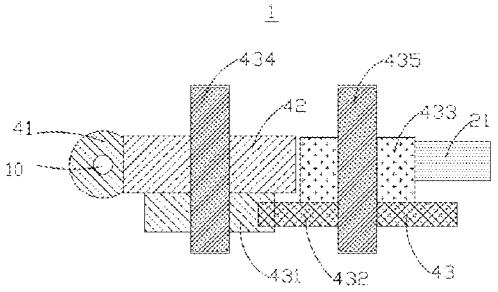
FIG. 4 is a schematic view taken in direction B-B in FIG. 2.

Referring to FIG. 1 to FIG. 4 together, FIG. 1 is a schematic structural view of a driving mechanism in an implementation of the present disclosure, FIG. 2 is a schematic structural view when a cage is removed in FIG. 1, FIG. 3 is a schematic view taken in direction A-A in FIG. 2, and FIG. 4 is a schematic view taken in direction B-B in FIG. 2. A driving mechanism 1 for a door lock is provided in this implementation. The driving mechanism 1 includes a motor 10, a planetary gear assembly 20, and a cage 30. The planetary gear assembly 20 includes a ring gear 21, a planet gear 22, and a sun gear 23. The motor 10 is rotatably connected to the ring gear 21. The ring gear 21 defines an accommodating space 211. The planet gear 22 and the sun gear 23 each are disposed in the accommodating space 211. The planet gear 22 is rotatably connected between the sun gear 23 and the ring gear 21. The planetary gear assembly 20 is disposed at one side of the cage 30. The ring gear 21 and the sun gear 23 each abut against the cage 30. The planet gear 22 is connected to the cage 30. When the sun gear 23 is in a fixed state, the ring gear 21 is driven by the motor 10 to rotate, to make the planet gear 22 rotate relative to the sun gear 23 to drive the cage 30 to rotate; or when the ring gear 21 is in a fixed state, the sun gear 23, the planet gear 22, and the cage 30 are configured to cooperate with one another, to make the planet gear 22 rotates relative to the sun gear 23 and the cage 30 rotate.

The driving mechanism 1 provided in this implementation is one of important structural components of the door lock. The door lock mainly includes the driving mechanism 1, a cylinder plug, and a lock body. The lock body is disposed in the door, the cylinder plug is disposed in the lock body, and a cam of the cylinder plug can drive a bolt of the lock body to extend or retract to realize open or close the door. The driving mechanism 1 is disposed outside the door, and is connected to both the door and the cylinder plug inside the door. The cylinder plug can be driven by movement of the driving mechanism 1 to move, such that extension or retraction of the bolt can be realized.

The driving mechanism 1 provided in this implementation includes the motor 10 and a power supply. The motor 10 is electrically connected to the power supply. The power supply can provide required energy for the motor 10. The motor 10 can operate and rotate when receiving electrical energy. Optionally, the power supply may be a rechargeable battery; or the power supply may be a non-rechargeable battery, such as a dry battery or a button battery. Further optionally, the dry battery or the button battery may be a lithium-ion battery.

The driving mechanism 1 provided in this implementation further includes the planetary gear assembly 20. The planetary gear assembly 20 consists of multiple structural components. For example, the planetary gear assembly 20 includes the ring gear 21, the planet gear 22, and the sun gear 23. Names of three structural components are all technical terms for gears used by those skilled in the art. The ring gear 21 is a circular ring gear, the accommodating space is defined in the ring gear 21, and the ring gear 21 has a ring of internal teeth and a ring of external teeth. The motor is rotatably connected to the external teeth of the ring gear 21. It can be understood that as for the motor 10 being rotatably connected to the external teeth of the ring gear 21, the motor 10 may be directly connected to the external teeth of the ring gear 21. Optionally, as for the motor 10 being rotatably connected to the external teeth of the ring gear 21, a transmission mechanism 40 is further disposed between the motor 10 and the ring gear 21, one end of the transmission mechanism 40 is rotatably connected to the motor 10, and the other end of the transmission mechanism 40 is rotatably connected to the ring gear 21. The transmission mechanism 40 is driven by rotation of the motor 10 to rotate, and the ring gear 21 is driven by rotation of the transmission mechanism 40 to rotate. Here, it can be considered that the motor 10 is directly rotatably connected to the ring gear 21. As for a specific structure of the transmission mechanism 40, it will be introduced in the present disclosure later.

In addition, the planet gear 22 and the sun gear 23 each have a ring of external teeth, and the planet gear 22 and the sun gear 23 each are disposed in the accommodating space 211. The planet gear 22 is rotatably connected between the sun gear 23 and the ring gear 21. It may also be understood that one of two opposites end of the planet gear 22 is rotatably connected to the internal teeth of the ring gear 21, and the other of the two opposite ends of the planet gear 22 is rotatably connected to the external teeth of the sun gear 23. The ring gear 21, the planet gear 22, and the sun gear 23 link the entire planetary gear assembly 20 together through the planet gear 22. Optionally, there may be multiple planet gears 22, and the multiple planet gears 22 are arranged at regular intervals. For example, there are three planet gears 22, and the three planet gears 22 are arranged at an interval of 120°. In this way, stability of rotation of the planetary gear assembly 20 and the cage 30.

The driving mechanism 1 provided in this implementation further includes the cage 30. The cage 30 is a support for mounting the planetary gear assembly 20 and other structural components. The planetary gear assembly 20 is disposed at one side of the cage 30, and the cylinder plug is disposed at the other side of the cage 30. The ring gear 21 and the sun gear 23 in the planetary gear assembly 20 each abut against the cage 30, and the planet gear 22 is connected to the cage 30. In this way, when the ring gear 21 and the sun gear 23 rotate, a state of motion of the cage 30 will not be affected. The planet gear 22 is connected to the cage 30, such that the rotation of the planet gear 22 can drive the cage 30 to rotate together. In other words, rotation of the cage 30 can also drive the planet gear 22 to rotate in a reverse direction, and the rotation of the cage 30 can further drive the cylinder plug to move, thereby finally realizing extension or retraction of the bolt in the door lock.

Figure 15:
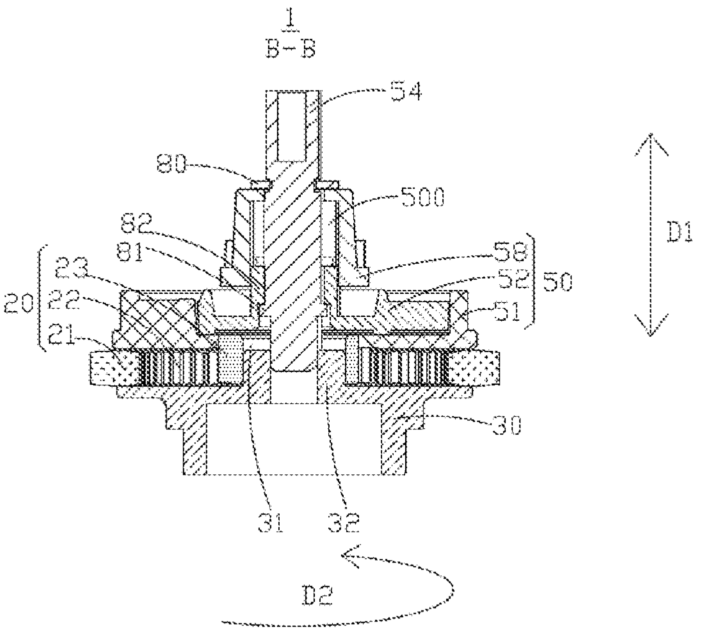
FIG. 15 is a schematic cross-sectional view taken in direction B-B in FIG. 14 in an implementation of the present disclosure.

Optionally, as illustrated in FIG. 3, the cage 30 defines a groove 31, the sun gear 23 has a boss 32, and the boss 32 is disposed in the groove 31. Optionally, as illustrated in FIG. 15, the cage 30 has the boss 32, the sun gear 23 defines a via hole 500, and the boss 32 is disposed in the via hole 500. In this way, the sun gear 23 abuts against the cage 30, and a position of the sun gear 23 can be limited by the boss 32 and the groove 31 or can be limited by the boss 32 and the via hole 500.

As mentioned above, a mechanical structure of the driving mechanism 1 provided in this implementation is introduced. Specifically, as for how to realize movement of the driving mechanism 1, in this implementation, the ring gear 21, the planet gear 22, and the sun gear 23 cooperate with one another to make the planet gear 22 rotate, and then the cage 30 is driven to rotate, and finally the cylinder plug connected to the cage 30 is driven to move, such that the door is opened or closed. A specific cooperation method of the ring gear 21, the planet gear 22, and the sun gear 23 may be understood as follows. Any one of the ring gear 21 and the sun gear 23 is fixed, and another of the ring gear 21 and the sun gear 23 rotates with the planet gear 22, such that the planet gear 22 can revolve around the sun gear 23, and the cage 30 can rotate. For example, when the sun gear 23 is in the fixed state, the ring gear 21 is driven by the motor 10 to rotate, such that the planet gear 22 rotates relative to the sun gear 23, then the cage 30 is driven to rotate, and the door is opened or closed by the motor 10. When the motor 10 fails and is unable to operate normally, the ring gear 21 is unable to rotate. Here, the ring gear 21 is in the fixed state, and the sun gear 23, the planet gear 22, and the cage 30 can cooperate with one another, such that the planet gear 22 rotates relative to the sun gear 23 and the cage 30 rotates, and finally the door is also opened or closed by the rotation of the cage 30.

Optionally, when the ring gear 21 is in the fixed state, two different implementations are provided in the present disclosure, and have different mechanical structures and transmission relationships, which will be described in detail later in the present disclosure.

Optionally, a structure and a method for fixing and rotating the sun gear 23 are introduced in detail later.

In summary, in the driving mechanism 1 provided in this implementation, the door can be opened or closed by adopting the motor 21 to control the ring gear 21 to rotate or by rotating the sun gear 23, such that a method for controlling the door lock is added, a problem that the door is unable to be opened or closed due to damage to the motor 10 in the motor lock with a single function is avoided, and a difficulty and a risk of opening the door is reduced.

Referring to FIG. 1 to FIG. 4 again, in this implementation, the driving mechanism 1 further includes a worm wheel 42 and a worm 41. The worm 41 is connected to the motor 10. One end of the worm wheel 42 is rotatably connected to the worm 41, and the other end of the worm wheel 42 is rotatably connected to the ring gear 21.

As mentioned above, the motor 10 can be indirectly rotatably connected to the ring gear 21 through the transmission mechanism 40. In this implementation, the transmission mechanism 40 may include the worm wheel 42 and the worm 41. The worm 41 is connected to the motor 10. One end of the worm wheel 42 is rotatably connected to the worm 41, and the other end of the worm wheel 42 is rotatably connected to the ring gear 21. The rotation of the motor 10 is transmitted to the ring gear 21 through the worm wheel 42 and the worm 41. A single-stage speed ratio of the worm wheel 42 to the worm 41 is relatively large, and noise and vibration are relatively little during rotation. The worm wheel 42 has a self-locking function with the worm 41. The self-locking function may be understood as that the worm 41 can be rotatably linked with the worm wheel 42 to rotate when the worm 41 rotates, but the locking worm wheel 42 is locked and immovable when the worm 41 does not move. In addition, since a rotation direction of the worm 41 is perpendicular to a rotation direction of the worm wheel 42, an arrangement direction of the motor 10 can be changed, thereby simplifying the structure of the driving mechanism 1 and reducing the overall size of the driving mechanism 1.

Optionally, as for the other end of the worm wheel 42 being rotatably connected to the ring gear 21, it may also be understood that the other end of the worm wheel 42 is indirectly rotatably connected to the ring gear 21. Further optionally, the transmission mechanism 40 further includes a gear assembly 43. The gear assembly 43 includes a first gear 431, a second gear 432, a third gear 433, a first rotating shaft 434, and a second rotating shaft 435. The worm wheel 42 and the first gear 431 are coaxially linked to rotate through the first rotating shaft 434. The first gear 431 is rotatably connected to the second gear 432. The second gear 432 and the third gear 433 are coaxially linked to rotate through the second rotating shaft 435. The third gear 433 is rotatably connected to the ring gear 21.

Figure 5:
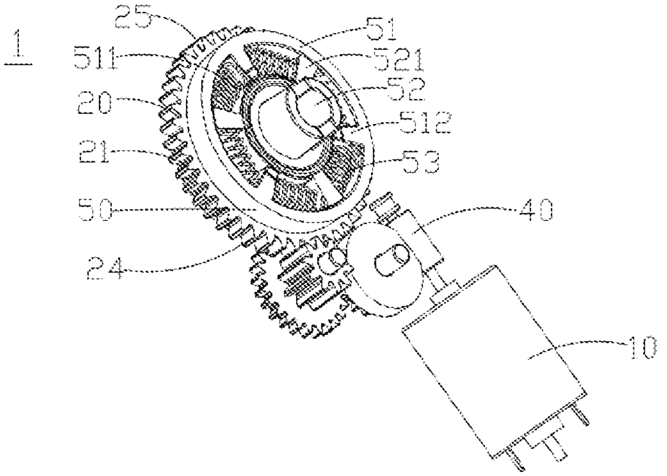
FIG. 5 is a schematic perspective structural view of a driving mechanism in an implementation of the present disclosure.
Figure 6:
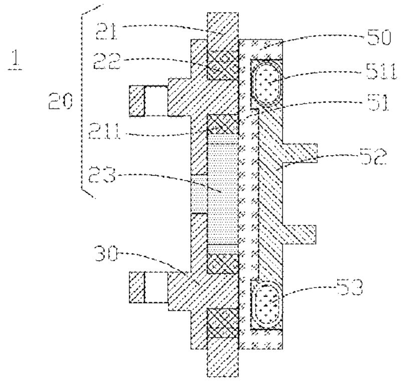
FIG. 6 is a schematic cross-sectional view of a driving mechanism in another implementation of the present disclosure taken in direction A-A.
Figure 7:
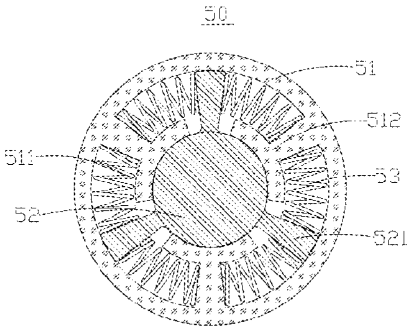
FIG. 7 is a top view of a bracket assembly in an implementation of the present disclosure.

Referring to FIG. 5 to FIG. 7 together, FIG. 5 is a schematic perspective structural view of a driving mechanism in an implementation of the present disclosure, FIG. 6 is a schematic cross-sectional view of a driving mechanism in another implementation of the present disclosure taken in direction A-A, and FIG. 7 is a top view of a bracket assembly in an implementation of the present disclosure. As mentioned above, when the ring gear 21 is in the fixed state, the two different implementations are provided in the present disclosure. In a first implementation provided in the present disclosure, when the ring gear 21 is in the fixed state, the sun gear 23 can be controlled to rotate, such that the planet gear 22 rotates relative to the ring gear 21, to drive the cage 30 to rotate. In this way, even when the motor 10 fails, the door can still be opened or closed by controlling the sun gear 23 to rotate.

Specifically, referring to FIG. 5 to FIG. 7 again, in this implementation, the driving mechanism 1 further includes a bracket assembly 50. The bracket assembly 50 includes a first bracket 51, a second bracket 52, and first elastic members 53. The sun gear 23 is connected to one side of the first bracket 51, and a buffer groove 511 is defined at the other side of the first bracket 51. First protrusions 512 protrude from a sidewall of the buffer groove 511. Second protrusions 521 protrude from a periphery of the second bracket 52. The second protrusions 521 are disposed in the buffer groove 511. The second bracket 52 has a fixed state or a rotating state. The first elastic members 53 are disposed in the buffer groove 511. Each of the first elastic members 53 elastically abuts between one first protrusion 512 and one second protrusion 521 adjacent to the first protrusion 512.

As mentioned above, the sun gear 23 has the fixed state and the rotating state. In this implementation, how to fix and rotate the sun gear 23 will be introduced. Specifically, in this implementation, the bracket assembly 50 may be additionally disposed. The bracket assembly 50 includes the first bracket 51, the second bracket 52, and the first elastic members 53. The sun gear 23 is connected to one side of the first bracket 51, that is, the first bracket 51 can drive the sun gear 23 to rotate, and the sun gear 23 can also drive the first bracket 51 to rotate. The buffer groove 511 is defined at the other side of the first bracket 51, and the first protrusions 512 protrude from the sidewall of the buffer groove 511.

The second protrusions 521 protrude from a peripheral surface of the second bracket 52. The second protrusions 521 are disposed in the buffer groove 511. The first protrusion 512 is spaced apart from the second protrusion 521. The second bracket 52 has the fixed state or the rotating state. How to enable the second bracket 52 to have the fixed state or the rotating state will be introduced in detail in the present disclosure below. In addition, the first elastic member 53 may be disposed in the buffer groove 511, and the first elastic member 53 elastically abuts between the first protrusion 512 and the second protrusion 521 adjacent to the first protrusion 512. The first elastic member 53 is an elastic structural component. Optionally, the first elastic member 53 may be a spring, an elastic foam, or the like.

Firstly, in this implementation, the first protrusion 512 may be connected to the second protrusion 521 through the first elastic member 53, such that the first bracket 51 is connected to the second bracket 52, and therefore, the first bracket 51 and the second bracket 52 can be linked to rotate. In other words, rotation of the first bracket 51 can drive the second bracket 52 to rotate, and rotation of the second bracket 52 can also drive the first bracket 51 to rotate. Secondly, since the first elastic member 53 has elasticity, the sun gear 23 can be flexibly connected to the planet gear 22 through the first elastic member 53. For example, during movement of the ring gear 21 being linked with the planet gear 22 to rotate around the sun gear 23, when the ring gear 21 is stuck, the first elastic member 53 is deformed and compressed by a reaction force. When the ring gear 21 is linked with the planet gear 22 to rotate around the sun gear 23 in a reverse direction, the first elastic member 53 releases a compressive stress to push the sun gear to reset, such that not only can a stuck phenomenon in gear transmission be prevented, but also the force required for reverse reset can be effectively reduced.

Figure 8:
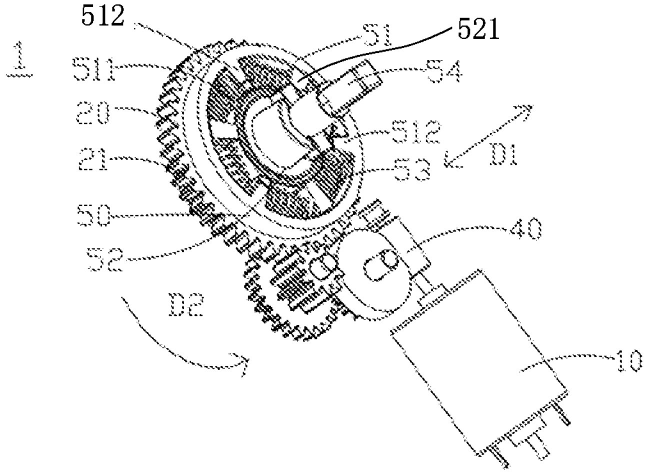
FIG. 8 is a schematic perspective structural view of a driving mechanism in another implementation of the present disclosure.
Figure 9:
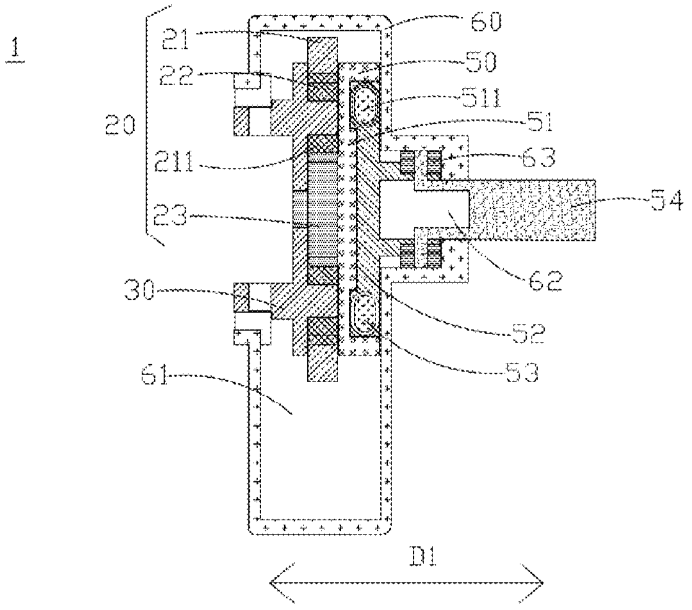
FIG. 9 is a schematic cross-sectional view of a driving mechanism in yet another implementation of the present disclosure taken in direction A-A.
Figure 10:
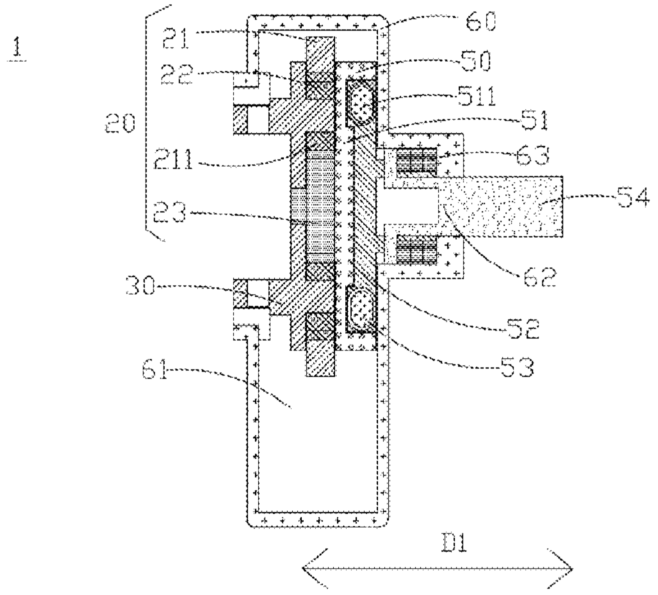
FIG. 10 is a schematic view of a second bracket in a rotating state in an implementation of the present disclosure.
Figure 11:
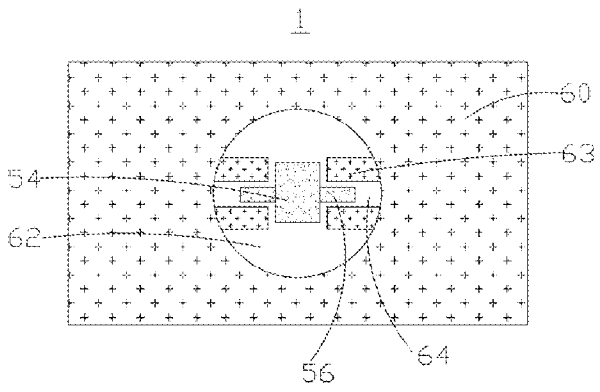
FIG. 11 is a top view of a driving mechanism in an implementation of the present disclosure.

Referring to FIG. 8 to FIG. 11 together, FIG. 8 is a schematic perspective structural view of a driving mechanism in another implementation of the present disclosure, FIG. 9 is a schematic cross-sectional view of a driving mechanism in yet another implementation of the present disclosure taken in direction A-A, FIG. 10 is a schematic view of a second bracket in a rotating state in an implementation of the present disclosure, and FIG. 11 is a top view of a driving mechanism in an implementation of the present disclosure. In this implementation, the driving mechanism 1 further includes a handle bracket 54 and a housing 60. The handle bracket 54 is slidably connected to the second bracket 52. A sliding direction of the handle bracket 54 is perpendicular to a rotation direction of the sun gear 23. The housing 60 defines a receiving space 61. The planetary gear assembly 20, and at least part of the motor 10 are disposed in the receiving space 61. The housing 60 defines a through hole 62 communicating with the receiving space 61. Part of the handle bracket 54 penetrates through the through hole 62. A snap-fit portion 63 protrudes from at least part of a sidewall of the through hole 62. The snap-fit portion 63 and the handle bracket 54 are configured to cooperate with each other to make the snap-fit portion 63 and the handle bracket 54 to be connected to or separated from each other.

In this implementation, how to enable the second bracket 52 to have the fixed state or the rotating state will be introduced in detail. Specifically, the handle bracket 54 and the housing 60 may be additionally disposed, the handle bracket 54 is slidably connected to the second bracket 52, and the sliding direction (as illustrated by direction D1 in FIG. 8) of the handle bracket 54 is perpendicular to the rotation direction (as illustrated by direction D2 in FIG. 8) of the sun gear 23. It may also be understood that the handle bracket 54 is not only connected to the second bracket 52, but also slides relative to the second bracket 52.

In addition, the housing 60 is an outer shell of the driving mechanism 1, and some structural components can be disposed in the receiving space 61 in the housing 60, such that the housing 60 can provide mounting foundation and protection foundation for the structural components of the driving mechanism 1. The housing 60 defines the through hole 62. The part of the handle bracket 54 penetrates through the through hole 62, and the rest of the handle bracket 54 is disposed outside the receiving space 61 of the housing 60. The handle bracket 54, disposed outside the receiving space 61, is configured to mount other structural members or directly for operation by a user. In this implementation, the snap-fit portion 63 protrudes from at least part of the sidewall of the through hole 62. The snap-fit portion 63 and the handle bracket 54 are configured to cooperate with each other to limit rotation of the handle bracket 54.

As illustrated in FIG. 9 and FIG. 11, the snap-fit portion 63 defines a limiting groove 64, and a limiting portion 56 protrudes from the handle bracket 54. When the handle bracket 54 is in the limiting groove 64 of the limiting portion 56, the limiting groove 64 can limit rotation of the limiting portion 56, such that the snap-fit portion 63 is connected to the handle bracket 54, that is, the rotation of the handle bracket 54 is limited by the snap-fit portion 63 of the housing 60. In other words, the rotation of the handle bracket 54 is limited by the housing 60, such that the second bracket 52 has the fixed state. As illustrated in FIG. 10, during movement of the handle bracket 54 towards the second bracket 52, when the limiting portion 56 is separated from the limiting groove 64 or the limiting portion 56 is separated from the sidewall of the through hole 62, the limiting groove 64 of the snap-fit portion 63 can no longer limit the limiting portion 56 of the handle bracket 54, such that the handle bracket 54 can rotate to drive the second bracket 52 to rotate. Therefore, the second bracket 52 has the rotating state, that is, the snap-fit portion 63 is separated from the handle bracket 54.

Optionally, when the sun gear 23 is to be fixed again, the handle bracket 54 can be moved away from the second bracket 52, and the limiting portion 56 can be disposed in the limiting groove 64 again, such that the rotation of the handle bracket 54 is limited, and the rotation of the second bracket 52, the rotation of the first bracket 51, and the rotation of the sun gear 23 are further limited in turn.

Figure 12:
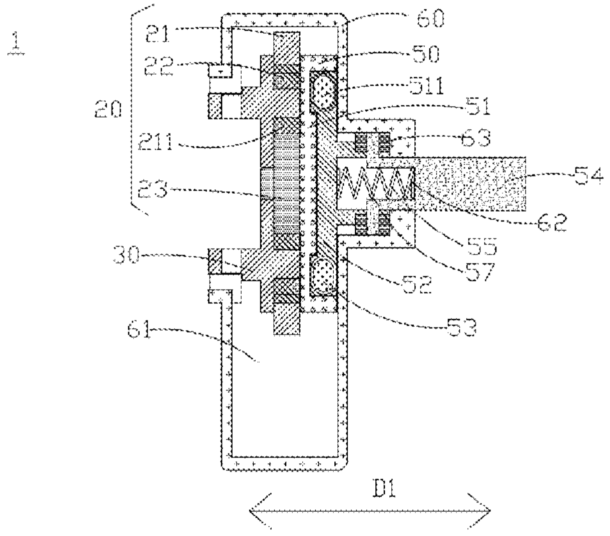
FIG. 12 is a schematic cross-sectional view of a driving mechanism in yet another implementation of the present disclosure taken in direction A-A.

Referring to FIG. 12, FIG. 12 is a schematic cross-sectional view of a driving mechanism in yet another implementation of the present disclosure taken in direction A-A. In this implementation, the driving mechanism 1 further includes a second elastic member 55. One end of the second elastic member 55 abuts against the handle bracket 54, and the other end of the second elastic member 55 abuts against the second bracket 52. When the handle bracket 54 moves toward the second bracket 52, the second elastic member 55 is in a compressed state.

In this implementation, the second elastic member 55 may be additionally disposed. The handle bracket 54 can be connected to the second bracket 52 through the second elastic member 55. When the handle bracket 54 moves toward the second bracket 52, the second elastic member 55 is in the compressed state. Here, the second elastic member 55 has a rebound force, and once an external force on the handle bracket 54 is removed, the handle bracket 54 can be automatically moved away from the second bracket 52 under the action of the rebound force of the elastic member, and the limiting portion 56 is disposed in the limiting groove 64 again, such that the rotation of the handle bracket 54 is limited, and the rotation of the second bracket 52, the rotation of the first bracket 51, and the rotation of the sun gear 23 are limited in turn.

Optionally, the handle bracket 54 defines a first accommodation groove 57 at one side of the handle bracket 54 close to the second bracket 52, and part of the second elastic member 55 is disposed in the first accommodation groove 57. In this implementation, the handle bracket 54 can also define the first accommodating groove 57 at one side of the handle bracket 54 close to the second bracket 52, and the part of the second elastic member 55 is disposed in the first accommodating groove 57, such that not only can a limiting ability of the second elastic member 55 be improved, but also the size of the driving mechanism 1 can be reduced and the driving mechanism 1 can be simplified.

Referring to FIG. 5 again, in this implementation, the motor 10 is disposed at a first side 24 of the planetary gear assembly 20, the bracket assembly 50 is disposed at a second side 25 of the planetary gear assembly 20, and the first side 24 is adjacent to the second side 25.

It can be seen from the above that the driving mechanism 1 provided in this implementation may include the motor 10, the planetary gear assembly 20, and the bracket assembly 50. With regard to an arrangement relationship of the motor 10, the planetary gear assembly 20, and the bracket assembly 50, the motor 10 is disposed at the first side 24 of the planetary gear assembly 20, the bracket assembly 50 is disposed at the second side 25 of the planetary gear assembly 20, and the first side 24 is adjacent to the second side 25. It may also be understood that the motor 10 and the bracket assembly 50 are disposed at two adjacent sides of the planetary gear assembly 20, such that the size of the driving mechanism 1 in the length direction can be reduced, the size of the driving mechanism 1 in the thickness direction can be increased, and the driving mechanism 1 is similar to a small and thick structure.

Figure 13:
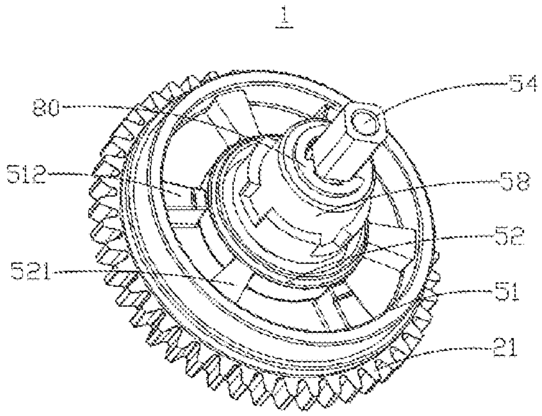
FIG. 13 is a schematic perspective structural view of a driving mechanism in yet another implementation of the present disclosure.
Figure 14:
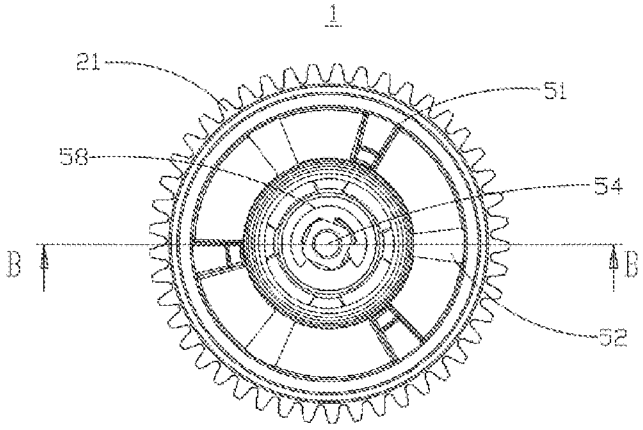
FIG. 14 is a top view of FIG. 13.

As mentioned above, a specific structure, a connection relationship, and a transmission relationship of the driving mechanism 1 when the ring gear 21 is in the fixed state have been introduced. Next, a second implementation provided in the present disclosure will continue to be introduced. Referring to FIG. 13 to FIG. 15 together, FIG. 13 is a schematic perspective structural view of a driving mechanism in yet another implementation of the present disclosure, FIG. 14 is a top view of FIG. 13, and FIG. 15 is a schematic cross-sectional view taken in direction B-B in FIG. 14 in an implementation of the present disclosure. In this implementation, when the ring gear 21 is in the fixed state, the cage 30 can be directly controlled to rotate, the planet gear 22 is driven to rotate, and the sun gear 23 is driven to rotate, such that the planet gear 22 rotates relative to the ring gear 21.

In the first implementation, the bracket assembly 50 is driven by the handle bracket 54 to rotate, then the sun gear 23 is driven to rotate, the planet gear 22 is further driven to rotate, and the cage 30 is finally driven to rotate. However, in the second implementation, the cage 30 can be directly controlled to rotate (for example, the handle bracket 54 is utilized to connect the cage 30 to directly control the cage 30 to rotate). The rotation of the cage 30 can drive the cylinder plug to move subsequently, such that the door is opened or closed. In addition, the planet gear 22 can also be driven by the rotation of the cage 30 to rotate, then the sun gear 23 is driven to rotate, and the bracket assembly 50 is further driven to rotate, such that rotation of a link structure is realized, and a stuck phenomenon is prevented.

In this implementation, the cage 30 can be directly controlled to rotate to open or close the door, and a transmission process between the bracket assembly 50, the sun gear 23, and the planet gear 22 is omitted, such that transmission time can be reduced, the loss in the transmission process is reduced, and stability and accuracy of transmission are improved.

Specifically, referring to FIG. 5 to FIG. 7 again. In this implementation, the driving mechanism 1 further includes the bracket assembly 50. The bracket assembly 50 includes a first bracket 51, a second bracket 52, and first elastic members 53. The sun gear 23 is connected to one side of the first bracket 51, a buffer groove 511 is defined at the other side of the first bracket 51, and the first protrusions 512 protrude from a sidewall of the buffer groove 511.

Second protrusions 521 protrude from a periphery of the second bracket 52. The second protrusions 521 are disposed in the buffer groove 511.

The first elastic member 53 is disposed in the buffer groove 511, and each of the first elastic members 53 elastically abuts between one first protrusion 512 and one second protrusion 521 adjacent to the first protrusion 512.

A structure of the first bracket 51, a structure of the second bracket 52, and a structure of the first elastic members 53 are the same as the above structures in the present disclosure, and will not be repeated in the present disclosure. The bracket assembly 50 provided in this implementation can realize flexible connection, such that not only can the stuck phenomenon in gear transmission be effectively prevented, but also the force required for reverse reset can be effectively reduced.

Figure 16:
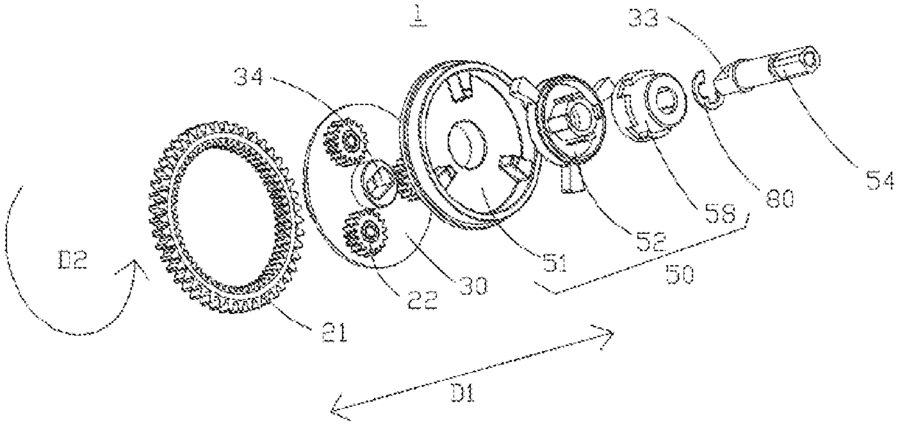
FIG. 16 is an exploded schematic view of a driving mechanism in an implementation of the present disclosure.

Referring to FIG. 13 to FIG. 16 together, FIG. 16 is an exploded schematic view of a driving mechanism in an implementation of the present disclosure. In this implementation, the driving mechanism 1 further includes a third bracket 58, the handle bracket 54, and the housing 60. The third bracket 58 is slidably connected to the second bracket 52. The handle bracket 54 is slidably connected to the bracket assembly 50. A sliding direction of the third bracket 58 and the sliding direction of the handle bracket 54 each are perpendicular to a rotation direction of the sun gear 23. The handle bracket 54 may be connected to or separated from the cage 30. The housing 60 defines the receiving space 61. The planetary gear assembly 20 and at least part of the motor 10 are disposed in the receiving space 61. The housing 60 defines a through hole 62 communicating with the receiving space 61. The handle bracket 54 penetrates through the through hole 62. The snap-fit portion 63 protrudes from at least part of the sidewall of the through hole 62. The snap-fit portion 63 and the third bracket 58 are configured to cooperate with each other to be connected to or separated from each other. The third bracket 58 has the fixed state or the rotating state.

In order to realize the above purpose, the driving mechanism 1 in this implementation may further include the third bracket 58, the handle bracket 54, and the housing 60. The handle bracket 54 is slidably connected to the bracket assembly 50. The handle bracket 54 may be connected to or separated from the cage 30. The sliding direction (as illustrated by direction D1 in FIG. 15 and FIG. 16) of the handle bracket 54 is perpendicular to the rotation direction of the sun gear 23. It may also be understood that the handle bracket 54 can slide relative to the bracket assembly 50, and can be connected to or separated from the cage 30. When the handle bracket 54 is connected to the cage 30, the rotation of the handle bracket 54 (i.e., rotation in a direction parallel to the rotation direction of the sun gear 23, as illustrated by direction D2 in FIG. 15 and FIG. 16) can drive the cage 30 to rotate. When the handle bracket 54 is separated from the cage 30, the rotation of the handle bracket 54 and the rotation of the cage 30 do not interfere with each other.

In addition, part of the handle bracket 54 may extend beyond the housing 60 through the through hole 62 to slide and rotate by the user.

Similarly, the third bracket 58 is slidably connected to the second bracket 52, and the third bracket 58 can be connected to or separated from the snap-fit portion 63 of the housing 60. The sliding direction (also as illustrated by direction D1 in FIG. 15 and FIG. 16) of the third bracket 58 is perpendicular to the rotation direction of the sun gear 23. It may also be understood that the third bracket 58 can slide relative to the second bracket 52, and can be connected to or separated from the housing 60. When the third bracket 58 is connected to the snap-fit portion 63, the third bracket 58 is also limited to keep rotatably fixed since the housing 60 is unable to rotate, such that the second bracket 52, the first bracket 51, and the sun gear 23 are further driven to keep the fixed state. When the third bracket 58 is separated from the snap-fit portion 63, the third bracket 58 can rotate (a rotation direction is also illustrated by direction D2 in FIG. 15 and FIG. 16), such that the second bracket 52, the first bracket 51, and the sun gear 23 each can rotate.

Optionally, the handle bracket 54 and the third bracket 58 may or may not slide simultaneously. In addition, the handle bracket 54 and the third bracket 58 rotate independently.

Based on the above structure, two specific processes of the movement of the cage 30 are introduced in detail in this implementation. When the sun gear 23 is in the fixed state (i.e., when the third bracket 58 is connected to the snap-fit portion 63), the ring gear 21 can be driven by the motor 10 to rotate, the planet gear 22 can be driven to rotate, and the cage 30 is driven to rotate. Here, if the handle bracket 54 is connected to the cage 30, the handle bracket 54 also rotates together with the cage 30. Here, if the handle bracket 54 is separated from the cage 30, the handle bracket 54 is in a stationary state.

When the ring gear 21 is in the fixed state, the handle bracket 54 is connected to the cage 30, and the snap-fit portion 63 is controlled to be separated from the third bracket 58; and the cage 30 is driven by the rotation of the handle bracket 54 to rotate, the planet gear 22 is driven to rotate, then the sun gear 23 is driven to rotate, and finally the bracket assembly 50 is driven to rotate. In fact, although the purpose of the present disclosure has been realized by the handle bracket 54 driving the cage 30 to rotate, it is still necessary for the cage 30 to drive the sun gear 23 and the bracket assembly 50 to rotate in order to prevent the stuck phenomenon.

In addition, FIG. 13 to FIG. 16 are schematic views when the first elastic members 53 are removed, such that the structure is clearer and it is easier for the reader to understand, which does not represent that the first elastic members 53 are not disposed in FIG. 13 to FIG. 16.

Referring to FIG. 16 again, in this implementation, the third bracket 58, the second bracket 52, the first bracket 51, and the sun gear 23 each define a via hole 500 to make the handle bracket 54 slide. The handle bracket 54 is provided with a first connecting portion 33 at one end of the handle bracket 54 close to the cage 30. The cage 30 is provided with a second connecting portion 34. The first connecting portion 33 and the second connecting portion 34 are configured to cooperate with each other to make the handle bracket 54 be connected to the cage 30.

In this implementation, it is introduced how the handle bracket 54 is slidably connected to the cage 30. The third bracket 58, the second bracket 52, the first bracket 51, and the sun gear 23 each may define the via hole 500, that is, the entire bracket assembly 50 and the sun gear 23 each define the via hole 500 to make the handle bracket 54 slidable, such that the handle bracket 54 can move towards or away from the cage 30. Then, the first connecting portion 33 is disposed at one end of the handle bracket 54 close to the cage 30, the second connecting portion 34 is disposed on the cage 30, and the first connecting portion 33 and the second connecting portion 34 can cooperate with each other to make the handle bracket 54 be connected to the cage 30.

Optionally, the first connecting portion 33 is a connecting block, the second connecting portion 34 is a connecting hole, and a shape of the connecting block and a shape of the connecting hole each are a polygon. When the connecting block is inserted into the connecting hole, the handle bracket 54 can be connected to the cage 30.

Referring to FIG. 15 again, in this implementation, when the ring gear 21 is in the fixed state, the handle bracket 54 is connected to the cage 30.

In this implementation, when the ring gear 21 is in the fixed state, the handle bracket 54 can have been connected to the cage 30, such that the handle bracket 54 can be rotated to directly rotate the cage 30 only by separating the third bracket 58 from the snap-fit portion 63, which reduces time for connecting the handle bracket 54 to the cage 30, and reduces driving time and a transmission difficulty.

Referring to FIG. 13 to FIG. 16 again, in this implementation, the driving mechanism 1 further includes a connecting member 80. The connecting member 80 is disposed between the third bracket 58 and the handle bracket 54. The connecting member 80 is snap-fitted with the third bracket 58 and the handle bracket 54 in a direction perpendicular to the rotation direction of the sun gear 23. When the handle bracket 54 slides, the third bracket 58 can be driven to slide, such that the third bracket 58 is connected to or separated from the snap-fit portion 63.

In this implementation, the connecting member 80 may be additionally disposed. The connecting member 80 is snap-fitted with the third bracket 58 and the handle bracket 54 in the direction perpendicular to the rotation direction of the sun gear 23. In other words, the third bracket 58 can be connected to the handle bracket 54 through the connecting member 80 in the direction perpendicular to the rotation direction of the sun gear 23, and the handle bracket 54 and the third bracket 58 are independently rotatable in the direction parallel to the rotation direction of the sun gear 23. In this way, when the handle bracket 54 slides, the third bracket 58 can be driven to slide together, such that the transmission difficulty is further reduced.

Optionally, the connecting member 80 is an E-type snap ring.

In addition, the handle bracket 54 is further provided with a first limiting portion 81. The second bracket 52 is provided with a second limiting portion 82 in the via hole 500 of the second bracket 52. The first limiting portion 81 is configured to cooperate with the second limiting portion 82 to limit a position of the handle bracket 54. In this implementation, the first limiting portion 81 can also cooperate with the second limiting portion 82 to limit a position of the handle bracket 54 away from the cage 30, so as to prevent the handle bracket 54 from falling from the via hole 500. In addition, the connecting member 80 can also be disposed to limit the handle bracket 54 from falling towards the cage 30. Therefore, in the present disclosure, the position of the handle bracket 54 and a sliding distance of the handle bracket 54 can be limited with the aid of the first limiting portion 81, the second limiting portion 82, and the connecting member 80, so as to prevent the handle bracket 54 from falling.

Figure 17:
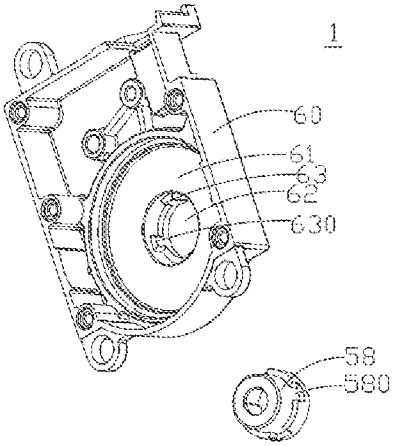
FIG. 17 is a schematic view of a housing and a third bracket in an implementation of the present disclosure.

Referring to FIG. 17, FIG. 17 is a schematic view of a housing and a third bracket in an implementation of the present disclosure. In this implementation, the snap-fit portion 63 includes multiple lugs 630 arranged at intervals. The third bracket 58 defines multiple slots 580 arranged at intervals at an outer periphery of the third bracket 58. When the third bracket 58 slides to make each of the multiple lugs 630 be disposed in each of the multiple slots 580, the snap-fit portion 63 is connected to the third bracket 58. When the third bracket 58 slides to make each of the multiple lugs 630 be separated from each of the multiple slots 580, the snap-fit portion 63 is separated from the third bracket 58.

In this implementation, the cheap-fit portion 63 includes the multiple lugs 630. The third bracket 58 defines the multiple slots 580 arranged at intervals at the outer periphery of the third bracket 58. In the direction parallel to the rotation direction of the sun gear 23, when the lug 630 is disposed in the slot 580, rotation of the third bracket 58 can be limited with the aid of the lug 630 and the slot 580, such that the third bracket 58 is in a fixed state. When the lug 630 is separated from the slot 580, the third bracket 58 is separated from the housing 60, and the third bracket 58 can rotate. The third bracket 58 can be separated from the housing 60 by sliding the third bracket 58 towards the cage 30. When the sun gear 23 needs to be fixed, it is only required to slide the third bracket 58 away from the cage 30, such that the lug 630 enters the slot 580.

Optionally, the number of lugs 630 and the number of slots 580 each are four, and the four lugs 630 are arranged at regular intervals and the four slots 580 are arranged at regular intervals, that is, an angle between two adjacent lugs 630 and an angle between two adjacent slots 580 each are 90°. In this way, after the user presses and rotates the handle bracket 54, the handle bracket 54 only needs to rotate 90° to reset. When the user let go the handle bracket 54, the lug 630 can be returned to the slot 580, such that the third bracket 58 is connected to the snap-fit portion 63.

Figure 18:
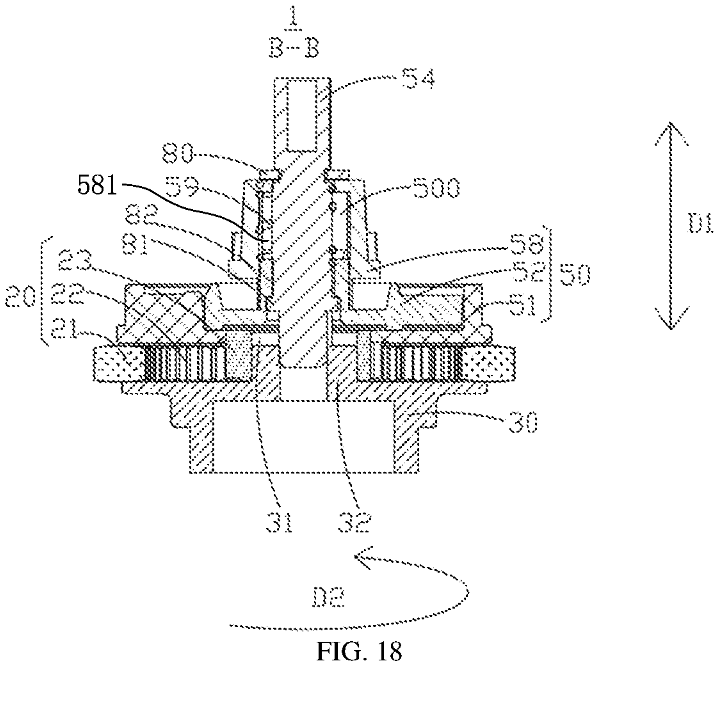
FIG. 18 is a schematic cross-sectional view taken in direction B-B in FIG. 14 in another implementation of the present disclosure.

Referring to FIG. 18, FIG. 18 is a schematic cross-sectional view taken in direction B-B in FIG. 14 in another implementation of the present disclosure. In this implementation, the driving mechanism 1 further includes a third elastic member 59. The third bracket 58 defines a second accommodating groove 581 at one side of the third bracket 58 close to the cage 30. Part of the third elastic member 59 is disposed in the second accommodating groove 581. The third elastic member 59 abuts against the third bracket 58 and the second bracket 52. When the handle bracket 54 slides towards the cage 30, the third elastic member 59 is in a compressed state.

In this implementation, the third elastic member 59 may be additionally disposed, and the third elastic member 59 can abut against the third bracket 58 and the second bracket 52. In this way, when the handle bracket 54 slides towards the housing 30, that is, when the ring gear 21 is fixed and the user needs to rotate the handle bracket 54 to drive the housing 30 to rotate, the user can press the handle bracket 54 to separate the third bracket 58 from the housing 60, and the third elastic member 59 can be in a compressed state. In this way, when the rotation is completed, the user only needs to let go the handle bracket 54, and the third elastic member 59 can drive the third bracket 58 to be fixed to the housing 60 again under a rebound force of the third elastic member 59, thereby realizing a purpose of automatic fixing.

Figure 19:
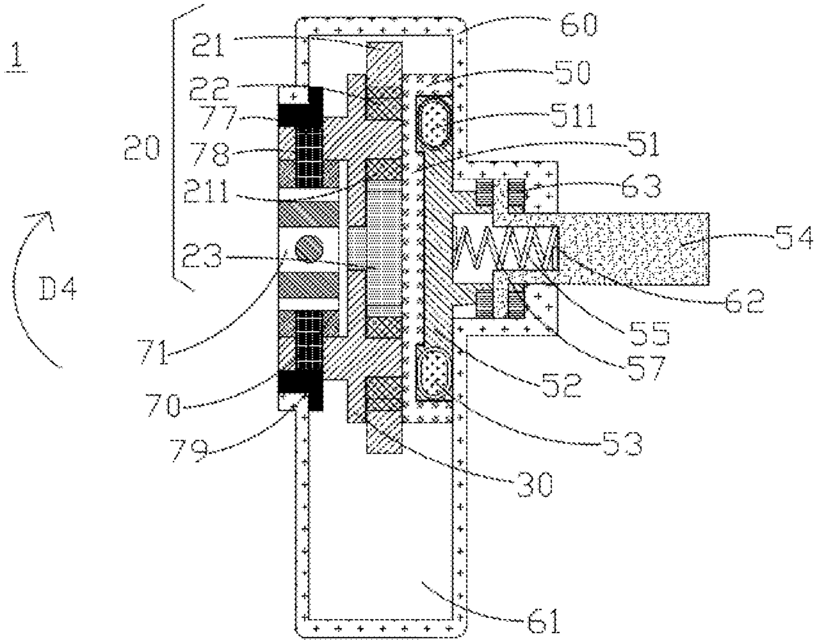
FIG. 19 is a schematic cross-sectional view of a driving mechanism in yet another implementation of the present disclosure taken in direction A-A.
Figure 20:
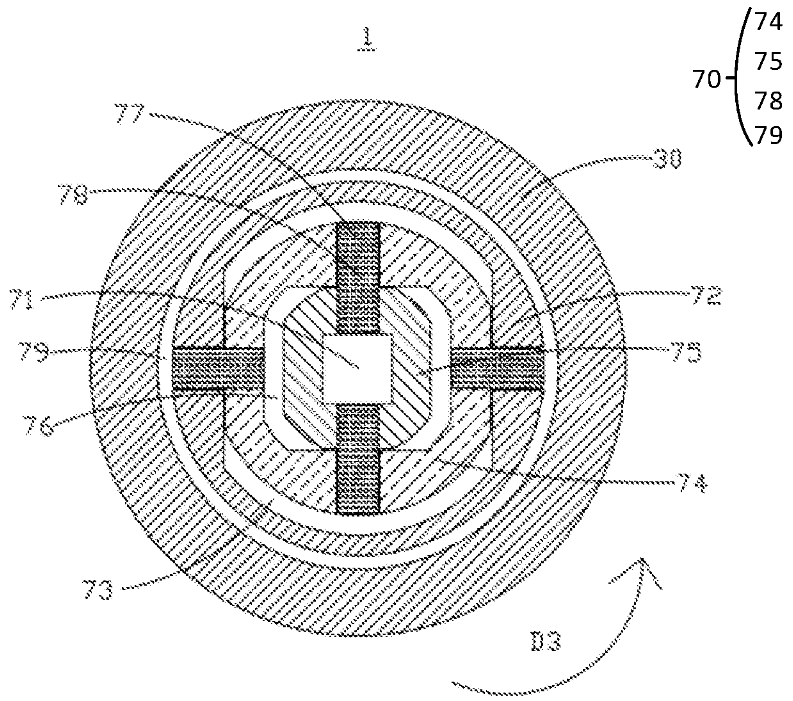
FIG. 20 is a top view of a driving mechanism in another implementation of the present disclosure.

Refer to FIG. 19 and FIG. 20 together, FIG. 19 is a schematic cross-sectional view of a driving mechanism in yet another implementation of the present disclosure taken in direction A-A, and FIG. 20 is a top view of a driving mechanism in another implementation of the present disclosure. In this implementation, the driving mechanism 1 further includes a universal joint 70. The universal joint 70 is rotatably connected to the other side of the cage 30. The cage 30 has a first rotation direction. The universal joint 70 has a second rotation direction. The first rotation direction intersects the second rotation direction. The universal joint 70 defines a third accommodating groove 71 for connecting a cylinder plug.

It can be seen from the above that another structural component (i.e., the cylinder plug) of the door lock is connected to the other side of the cage 30, and the cylinder plug of the door lock and the planetary gear assembly 20 of the door lock are disposed at two opposite sides of the cage 30 respectively. In an implementation, the cylinder plug of the door lock is perpendicularly connected to the cage 30, such that the driving mechanism 1 and the cylinder plug are concentric during docking and linkage of the driving mechanism 1 and the cylinder plug, and then a force on the cage 30 is better transmitted to the cylinder plug, thereby reducing the difficulty of unlocking. Therefore, in this implementation, the universal joint 70 may be additionally disposed in the driving mechanism 1, the universal joint 70 is rotatably connected to the other side of the cage 30, and the universal joint 70 defines the third accommodating groove 71 for connecting the cylinder plug.

In addition, the cage 30 has the first rotation direction (as illustrated by direction D3 in FIG. 20), the universal joint 70 has the second rotation direction (as illustrated by direction D4 in FIG. 19), and the first rotation direction intersects with the second rotation direction. It may also be understood that the first rotation direction is not parallel to the second rotation direction. In this way, when the cylinder plug is mounted in the third accommodating groove 71, a deflection angle between the cylinder plug and the cage 30 can be offset through rotation of the universal joint 70, such that the force on the cage 30 is better transmitted to the cylinder plug, and a problem of non-concentricity between the driving mechanism 1 and the cylinder plug during the docking and linkage of the driving mechanism 1 and the cylinder plug is corrected and solved.

Figure 21:
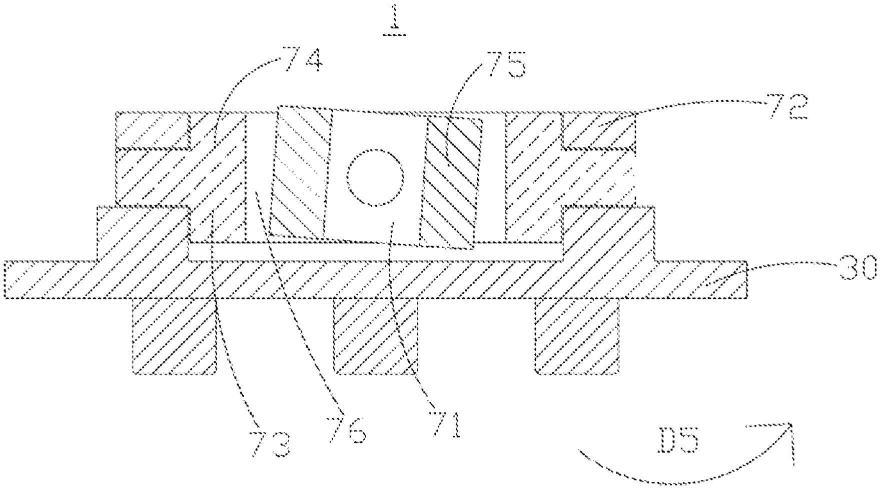
FIG. 21 is a schematic view of a universal joint rotating in a first rotation sub-direction in an implementation of the present disclosure.
Figure 22:
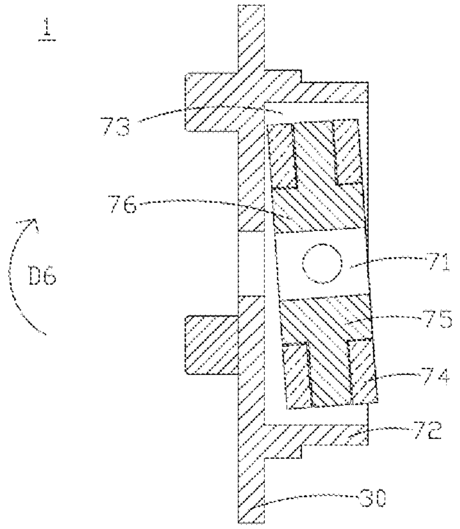
FIG. 22 is a schematic view of a universal joint rotating in a second rotation sub-direction in an implementation of the present disclosure.

Referring to FIG. 21 and FIG. 22 together, FIG. 21 is a schematic view of a universal joint rotating in a first rotation sub-direction in an implementation of the present disclosure, and FIG. 22 is a schematic view of a universal joint rotating in a second rotation sub-direction in an implementation of the present disclosure. In this implementation, a third protrusion 72 protrudes from the other side surface of the cage 30. It can be understood that the other side surface of the cage may refer to a surface of the cage that is opposite to a surface of the cage where the planetary gear assembly 20 is disposed. The third protrusion 72 defines a first rotation space 73. The universal joint 70 includes a first rotation portion 74 and a second rotation portion 75. The first rotation portion 74 is disposed in the first rotation space 73. The first rotation portion 74 is rotatably connected to the first rotation space 72. The first rotation portion 74 defines a second rotation space 76. The second rotation portion 75 is disposed in the second rotation space 76. The second rotation portion 75 is rotatably connected to the first rotation portion 74. The second rotation portion 75 defines the third accommodating groove 71. The first rotation portion 74 has a first rotation sub-direction. The second rotation protrusion 75 has a second rotation sub-direction. The first rotation sub-direction intersects the second rotation sub-direction. The first rotation sub-direction and the second rotation sub-direction each intersect the second rotation direction.

In this implementation, the first protrusion 72 protrudes from the cage 30, the first rotation portion 74 of the universal joint 70 and the second rotation portion 75 of the universal joint 70 are disposed in the first rotation space 73 in the third protrusion 72, and the first rotation portion 74 is rotatably connected to the third protrusion 72, such that the first rotation portion 74 is in transitional fit connection with the third protrusion 72 parallelly through a rotating shaft 78. In this way, the first rotation portion 74 can have the first rotation sub-direction (as illustrated by direction D5 in FIG. 21). In addition, the second rotation portion 75 can also by disposed in the second rotation space 76 in the first rotation protrusion 74, and the second rotation protrusion 75 is rotatably connected to the first rotation protrusion 74, such that the second rotation protrusion 75 is in transitional fit connection with the first rotation protrusion 74 perpendicularly through the rotation direction 78. In this way, the second rotation protrusion 75 has the second rotation sub-direction (as illustrated by direction D6 in FIG. 22). The second rotation protrusion 75 defines the third accommodating groove 71 for connecting the cylinder plug.

In the above implementation, the second rotation direction may be formed by combining the first sub-rotation direction and the second sub-rotation direction. In addition, in this implementation, the first rotation sub-direction may also intersect the second rotation sub-direction, and the first rotation sub-direction and the second rotation sub-direction each intersect the second rotation direction. In this way, the universal joint 70 can have more rotation directions, such that the problem of non-concentricity between the driving mechanism 1 and the cylinder plug during the docking and linkage of the driving mechanism 1 and the cylinder plug can be further corrected and solved.

Optionally, referring to FIG. 19 to FIG. 20 again, in this implementation, the third protrusion 72 defines a via hole 77. The universal joint 70 further includes a rotating shaft 78 and a protective portion 79. The rotating shaft 78 penetrates through the via hole 77 and is connected to the first rotating portion 74. The protective portion 79 is sleeved on the third protrusion 72, such that the rotating shaft 78 abuts against the protective portion 79.

As mentioned above, the first rotation portion 74 is rotatably connected to the third protrusion 72, the third protrusion 72 defines the via hole 77, and the rotating shaft 78 penetrates through the via hole 77 and is connected to the first rotation portion 74, such that the first rotation portion 74 is rotatably connected to the third protrusion 72. In this implementation, the protective portion 79 can further be disposed outside the third protrusion 72, and the protective portion 79 is sleeved on the third protrusion 72, such that the rotating shaft 78 abuts against the protective portion 79, thereby preventing the rotating shaft 78 from falling from the via hole 77.

A door lock is further provided in implementations of the present disclosure. The door lock includes a cylinder plug and the driving mechanism 1 provided in the above implementations of the present disclosure. The cylinder plug is connected to the other side of the cage 30. The cylinder plug is driven by the cage 30 to move to open or close a door.

In the door lock provided in implementations of the present disclosure, by adopting the driving mechanism 1 provided in implementations of the present disclosure, the door can be opened or closed by adopting the motor 10 to control the ring gear 21 to rotate or by controlling the sun gear 23 to rotate, such that the method for controlling the door lock is added, the problem that the door is unable to be opened or closed due to the damage to the motor 10 in the single motor lock is avoided, and the difficulty and the risk of opening the door are reduced.

Content provided by implementations of the present disclosure has been introduced in detail in the above, and principles and implementations of the present disclosure are illustrated and explained herein. Above explanations are only for facilitating understanding of the methods and core ideas of the present disclosure. At the same time, according to the ideas of the present disclosure, changes in specific implementations and an application scope can be made by those ordinary skilled in this art. To sum up, Content of this specification should not be construed as limitation of the present disclosure.

What is claimed is:

1. A driving mechanism for a door lock, comprising:

a motor;

a planetary gear assembly comprising a ring gear, a planet gear, and a sun gear, wherein the motor is rotatably connected to the ring gear, the planet gear is rotatably connected to the ring gear, and the planet gear is further rotatably connected to the sun gear; and a cage connected to the planet gear; wherein when the sun gear is in a fixed state, the ring gear is driven by the motor to rotate, to make the planet gear rotate relative to the sun gear, to drive the cage to rotate; or when the ring gear is in a fixed state, the sun gear, the planet gear, and the cage are configured to cooperate with one another, to make the planet gear rotate relative to the sun gear and the cage rotate; wherein when the ring gear is in the fixed state, the sun gear is controlled to rotate, to make the planet gear rotate relative to the ring gear, to drive the cage to rotate;

the driving mechanism further comprises a bracket assembly, wherein the bracket assembly comprises a bracket, a second bracket, and first elastic members, the sun gear is connected to one side of the first bracket, a buffer groove is defined at the other side of the first bracket, and first protrusions protrude from a sidewall of the buffer groove;

second protrusions protrude from a periphery of the second bracket, the second protrusions are disposed in the buffer groove, and the second bracket has a fixed state or a rotating state; and the first elastic members are disposed in the buffer groove, and each of the first elastic members elastically abuts between one first protrusion and one second protrusion adjacent to the first protrusion.

2. The driving mechanism of claim 1, wherein the ring gear defines an accommodating space, the planet gear and the sun gear each are disposed in the accommodating space, and the planet gear is rotatably connected between the sun gear and the ring gear; and the planetary gear assembly is disposed at one side of the cage, and the ring gear and the sun gear each abut against the cage.

3. The driving mechanism of claim 1, further comprising a handle bracket and a housing, wherein the handle bracket is slidably connected to the second bracket, and a sliding direction of the handle bracket is perpendicular to a rotation direction of the sun gear; and the housing defines a receiving space, the planetary gear assembly and at least part of the motor are disposed in the receiving space, the housing defines a through hole communicating with the receiving space, part of the handle bracket penetrates through the through hole, a snap-fit portion protrudes from at least part of a sidewall of the through hole, and the snap-fit portion and the handle bracket are configured to cooperate with each other to be connected to or separated from each other.

4. The driving mechanism of claim 3, further comprising a second elastic member, one end of the second elastic member abuts against the handle bracket, the other end of the second elastic member abuts against the second bracket, and when the handle bracket moves towards the second bracket, the second elastic member is in a compressed state.

5. The driving mechanism of claim 4, wherein the handle bracket defines a first accommodating groove at one side of the handle bracket close to the second bracket, and part of the second elastic member is disposed in the first accommodating groove.

6. The driving mechanism of claim 1, wherein the motor is disposed at a first side of the planetary gear assembly, the bracket assembly is disposed at a second side of the planetary gear assembly, and the first side is adjacent to the second side.

7. A door lock comprising a cylinder plug and a driving mechanism, wherein the driving mechanism comprises:

a motor;

a planetary gear assembly comprising a ring gear, a planet gear, and a sun gear, wherein the motor is rotatably connected to the ring gear, the planet gear is rotatably connected to the ring gear, and the planet gear is also rotatably connected to the sun gear; and a cage connected to the planet gear; wherein when the sun gear is in a fixed state, the ring gear is driven by the motor to rotate, to make the planet gear rotate relative to the sun gear, to drive the cage to rotate; or when the ring gear is in a fixed state, the sun gear, the planet gear, and the cage are configured to cooperate with one another, to make the planet gear rotate relative to the sun gear and the cage rotate, wherein when the ring gear is in the fixed state, the sun gear is controlled to rotate, to make the planet gear rotate relative to the ring gear, to drive the cage to rotate;

the driving mechanism further comprises a bracket assembly, wherein the bracket assembly comprises a bracket, a second bracket, and first elastic members, the sun gear is connected to one side of the first bracket, a buffer groove is defined at the other side of the first bracket, and first protrusions protrude from a sidewall of the buffer groove;

second protrusions protrude from a periphery of the second bracket, the second protrusions are disposed in the buffer groove, and the second bracket has a fixed state or a rotating state; and the first elastic members are disposed in the buffer groove, and each of the first elastic members elastically abuts between one first protrusion and one second protrusion adjacent to the first protrusion; and the cylinder plug is connected to the driving mechanism, and the cylinder plug is driven by the driving mechanism to move to open or close a door.

8. A driving mechanism for a door lock, comprising:

a motor;

a planetary gear assembly comprising a ring gear, a planet gear, and a sun gear, wherein the motor is rotatably connected to the ring gear, the planet gear is rotatably connected to the ring gear, and the planet gear is further rotatably connected to the sun gear; and a cage connected to the planet gear; wherein when the sun gear is in a fixed state, the ring gear is driven by the motor to rotate, to make the planet gear rotate relative to the sun gear, to drive the cage to rotate; or when the ring gear is in a fixed state, the sun gear, the planet gear, and the cage are configured to cooperate with one another, to make the planet gear rotate relative to the sun gear and the cage rotate; wherein when the ring gear is in the fixed state, the cage is directly controlled to rotate to drive the planet gear to rotate and the sun gear to rotate, and make the planet gear rotate relative to the ring gear;

the driving mechanism further comprises a bracket assembly, wherein the bracket assembly comprises a first bracket, a second bracket, and first elastic members, the sun gear is connected to one side of the first bracket, a buffer groove is defined at the other side of the first bracket, and first protrusions protrude from a sidewall of the buffer groove;

second protrusions protrude from a periphery of the second bracket, and the second protrusion are disposed in the buffer groove; and the first elastic members are disposed in the buffer groove, and each of the first elastic members elastically abuts between one first protrusion and one second protrusion adjacent to the first protrusion.

9. The driving mechanism of claim 8, wherein the ring gear defines an accommodating space, the planet gear and the sun gear each are disposed in the accommodating space, and the planet gear is rotatably connected between the sun gear and the ring gear; and the planetary gear assembly is disposed at one side of the cage, and the ring gear and the sun gear each abut against the cage.

10. The driving mechanism of claim 8, further comprising a third bracket, a handle bracket, and a housing, wherein the third bracket is slidably connected to the second bracket, the handle bracket is slidably connected to the bracket assembly, and a sliding direction of the third bracket and a sliding direction of the handle bracket each are perpendicular to a rotation direction of the sun gear; and the handle bracket is connected to or separated from the cage; and the housing defines a receiving space, the planetary gear assembly and at least part of the motor are disposed in the receiving space, the housing defines a through hole communicating with the receiving space, the handle bracket penetrates through the through hole, a snap-fit portion protrudes from at least part of a sidewall of the through hole, the snap-fit portion and the third bracket are configured to cooperate with each other to be connected to or separated from each other, and the third bracket has a fixed state or a rotating state.

11. The driving mechanism of claim 10, wherein when the ring gear is in the fixed state, the handle bracket is connected to the cage, and the snap-fit portion is controlled to be separated from the third bracket; and the cage is driven to rotate by rotation of the handle bracket, to drive the planet gear to rotate, to drive the sun gear to rotate, to drive the bracket assembly to rotate.

12. The driving mechanism of claim 11, wherein when the ring gear is in the fixed state, the handle bracket is connected to the cage.

13. The driving mechanism of claim 10, wherein the third bracket, the second bracket, the first bracket, and the sun gear each define a via hole to make the handle bracket slide, the handle bracket is provided with a first connecting portion at one end of the handle bracket close to the cage, the cage is provided with a second connecting portion, and the first connecting portion and the second connecting portion are configured to cooperate with each other to make the handle bracket be connected to the cage.

14. The driving mechanism of claim 13, further comprising a connecting member, wherein the connecting member is disposed between the third bracket and the handle bracket, and the connecting member is snap-fitted with the third bracket and the handle bracket in a direction perpendicular to the rotation direction of the sun gear; and when the handle bracket slides, the third bracket is driven to slide, to make the third bracket and the snap-fit portion be connected to or separated from each other.

15. The driving mechanism of claim 14, further comprising a third elastic member, wherein the third bracket defines a second accommodating groove at one side of the third bracket close to the cage, part of the third elastic member is disposed in the second accommodating groove, and the third elastic member abuts against the third bracket and the second bracket; and when the handle bracket slides towards the cage, the third elastic member is in a compressed state.

16. The driving mechanism of claim 13, wherein the snap-fit portion comprises a plurality of lugs arranged at intervals, and the third bracket defines a plurality of slots arranged at intervals at an outer periphery of the third bracket; when the third bracket slides to make each of the plurality of lugs be disposed in each of the plurality of slots, the snap-fit portion is connected to the third bracket; and when the third bracket slides to make each of the plurality of lugs be separated from each of the plurality of slots, the snap-fit portion is separated from the third bracket.

* * * * *